United States

McNaney

4,004,847

Jan. 25, 1977

[54] LIGHT OPTIC DATA HANDLING SYSTEM

[76] Inventor: Joseph T. McNaney, 8548 Boulder Drive, La Mesa, Calif. 92041

[22] Filed: Feb. 4, 1976

[21] Appl. No.: 655,152

[52] U.S. Cl. .......................................... 350/161 W
[51] Int. Cl.² .......................................... G02F 1/16
[58] Field of Search .......................... 350/160, 161

[56] References Cited

UNITED STATES PATENTS

| | | | |
|---|---|---|---|
| 3,790,898 | 2/1974 | Gudmundson et al. | 350/161 |
| 3,919,669 | 11/1975 | Hartemann | 350/161 |
| 3,960,440 | 6/1976 | McNaney | 350/161 |

*Primary Examiner*—William L. Sikes

[57] ABSTRACT

The system herein includes light optic means which function as a light beam distributor in making available, almost instantly, an information bearing beam of light at any of a plurality of differently positioned output paths of the system as opposed to the conventional or more well known line scan beam deflection systems.

5 Claims, 4 Drawing Figures

LIGHT OPTIC DATA HANDLING SYSTEM

SUMMARY OF THE INVENTION

A beam of light, preferably from a laser source of light, which can be in the form of radiant energy extending from ultraviolet, through the visible spectrum, to infrared, is directed along an input path toward a light admitting surface of the data handling system of this invention. Upon entering the system light is then directed along a path therein which will be referred to as a primary optical path within the system. In following the primary path a light beam undergoes a series of light reflections which cause the beam to spiral its way through a length dimension of the system so as to make available light thereof at any of a number of output positions extended along the length dimension of the system. By means of controllable OFF or ON conditioned light reflection control means supported in an optical control relationship to each of the output positions light may be directed, selectively, along secondary paths stemming from said output positions. Light output from the system can be used in communications, for light beam information display or recording, or for data control purposes. It is, however, an object of the invention to extend the resolution and deflection capabilities beyond that of present day acoustoptic, electro-optic, or other light beam positioning means.

The invention is illustrated, by way of example only, in the accompanying drawings, and the description which follows when read in connection with the drawings will provide a better understanding of the objectives and other advantages of the invention.

DESCRIPTION OF THE INVENTION

Figure 1:
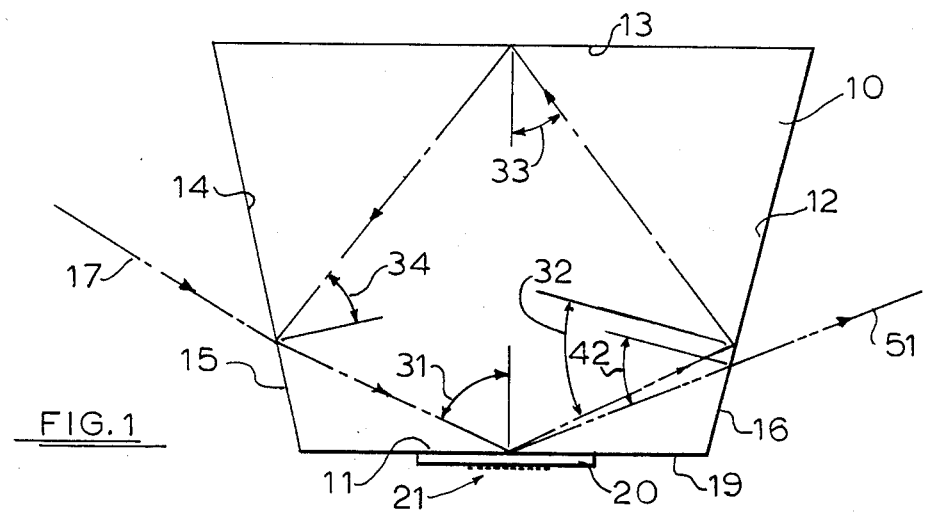
FIGS. 1 and 2 show first and second views, illustratively, of the light reflecting means of the invention.
Figure 2:
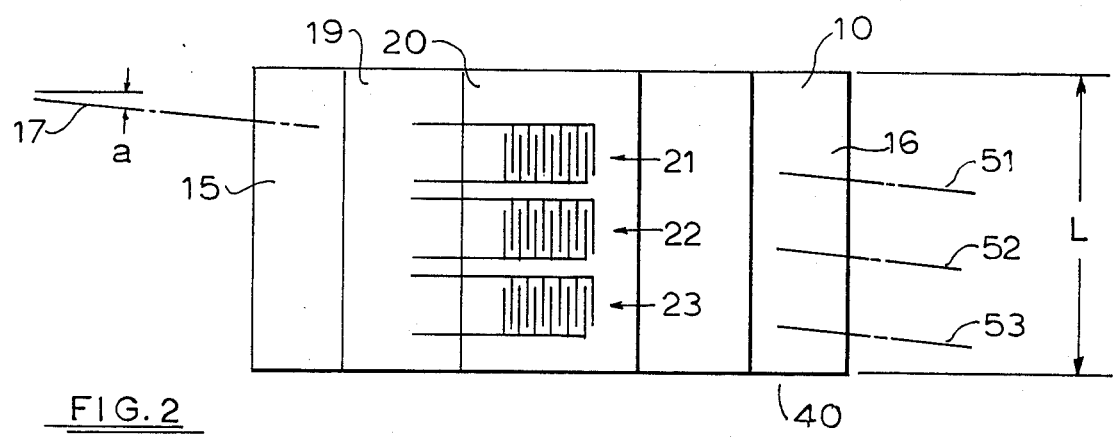

Referring to FIGS. 1 and 2, the partly schematic views of the invention are designed to show a member 10, which will be referred to as a light guide, having a length dimension L, and being of a light conducting material such as quartz, tourmaline, barium titanate, lithium niobate, or still other materials exhibiting piezoelectric effects, Kerr effects or Pockels effects, or of a glass or plastic material. The member 10 is exemplified as having four light reflecting surfaces 11, 12, 13 and 14, an input surface 15 and an output surface 16. Light, preferably from a laser source, is directed along an input path 17 at a predetermined angle a, as indicated in FIG. 2. The angle indicated, as well as all dimensions of the FIGS. in the drawing, are of course examplary for the purpose of simplifying the discussion of the invention. Upon entering the member 10, the light from the source will be directed along, what will be referred to as, a primary optical path by means of the reflecting surfaces 11, 12, 13 and 14, and then again by the surface 11, 12, etc. in effect spiralling its way through the length dimension L of the member 10 and thereby following a series of 360° optical paths each displaced one with respect to the other in a side-by-side relationship. The object is to have the beam of light appear at each of a series of predetermined potential secondary reflection positions along the length dimension L.

Figures 3, 4:
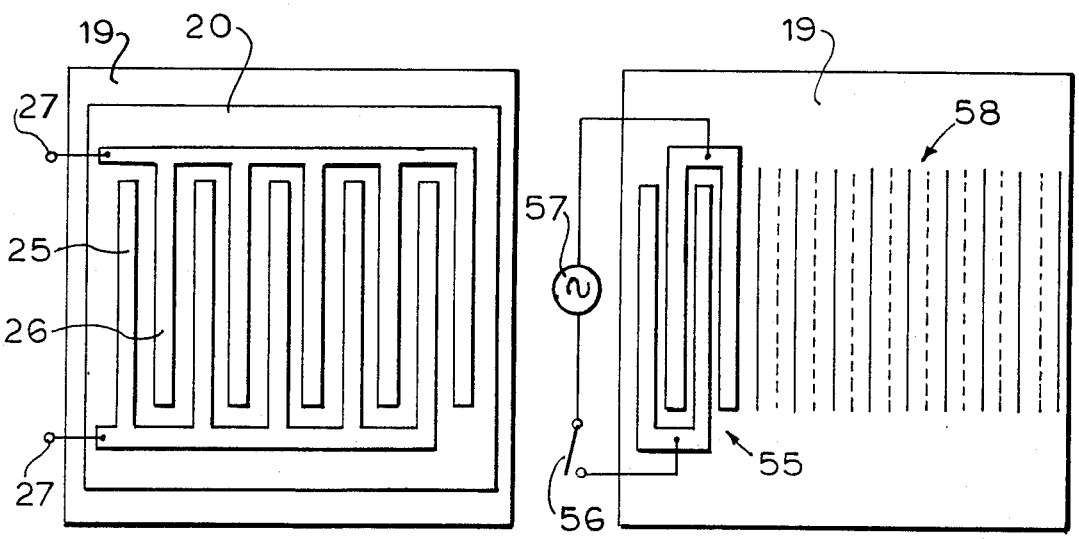
FIGS. 3 and 4 are diagrammatic presentations, respectively, of first and second light reflection control means that may be included in the invention.

The surface 19 of the member 10 is shown having deposited thereon a thin amorphous film 20 composed of material such as glass, as at least one example, having a thickness of 1-micron or more, and upon the outer surface thereof and intimately joined thereto there is a series of individual interdigital electrode structures, 21, 22 and 23, each of which are drawn greatly enlarged, and also limited to a showing of but three, to simplify the description of the invention. The position of each electrode structure will coincide with each of the predetermined potential secondary reflection positions at which a beam of light will become available for a controlled redirecting of light along secondary output paths of the system. One such electrode structure is further illustrated in FIG. 3, showing each to be comprised of electrodes 25 and 26 and terminals 27 to which an electrical potential will be connected.

In describing the operation of the invention the use of a material exhibiting piezoelectric effects as a light guide 10 material will be considered. The light guide 10 is illustrated as having a trapezoidal cross section, and the four outer surfaces thereof are to be considered polished sufficiently to meet the requirements of the invention. Also the light guide 10 material will be considered as having an index of refraction of 1.66, supported in an atmospheric air environment and as illustrated, the member 10 of the invention provides an array of four, 11, 12, 13 and 14, light reflecting interfaces of first and second light conducting media, presenting, respectively, first and second predetermined indices of refraction, each angularly oriented so as to establish an optical relationship one with respect to the other and with respect to the input path 17. Light entering the guide 10 from along the path 17 will be incident on the interface 11 of the guide 10 material and the film 20 material at an angle 31 of 66°, then totally reflected therefrom at the same angle toward the interface 12 and incident thereon at an angle 32 of 38°. Light is then totally reflected therefrom at the same angle toward the interface 13 and incident thereon at an angle 33 of 38°, then totally reflected at the same angle therefrom toward the interface 14 and incident thereon at an angle 34 of 38°, completing an initial 360° spiral. Light is then totally reflected from the interface 14 at the angle of 38° toward the interface 11 and is incident thereon at the angle 31 of 66° so as to begin the next spiral thereof in the direction of the length dimension L, and so on, until reaching the opposite end 40 of the light guide 10.

The object of considering the use of a light guide 10 material having an index of 1.66, is that the critical angle insofar as light reflections at the interfaces 12, 13 and 14 are concerned is 27°, an angle at least lower than the angle 32 of 38° at which light will be incident on the interface 12 and also at which light will be incident on the interfaces 13 and 14. Still other indices for the light guide material 10 may be considered, however, selections of materials and angular relationships of the four, or more, light reflecting surfaces being referred to should permit total reflections of the light through the length L of the light guide 10. In regard to the index of refraction of the film material 20, the index thereof shall be sufficiently lower than that of the guide material 10 to provide the total light reflections at the interface 11 thereof as stated in the foregoing discussion of the invention.

Upon the application of an electrical potential to the terminals 27 of the electrodes 25 and 26 a voltage difference between these interdigital electrodes generates a periodic strain in the guide 10 material and film 20 material coincident with the interface thereof because of the electrical transducer properties of the piezoelectrical guide 10 material. The periodic strain establishes a spatial modulation of the refractive index of these materials coincident with their interface which acts as a diffraction grating for light incident thereon to the extent of increasing the angle of light reflections therefrom. In view of the foregoing considerations the normal angle of 66° light reflection at the interface 11 of the guide 10 and film 20 materials can be increased, for example, to a light reflection angle of 78°, or sufficiently greater than the initial angle of 66° so as to provide an angle 42 incident on the interface 12 at or below the critical angle insofar as light reflections at the interface 12 are concerned, for thereupon frustrating such reflections and permit a passing of light through the interface 12 and along a secondary path 51 beyond the limits of the system. Each of the output paths 51, 52 and 53 shown in FIG. 2 are related to light reflection positions of the member 10 adjacently, respectively, electrode structures 21, 22 and 23.

Since relatively small angular changes are necessary between a total light reflection angle 32 and an angle 42 at which angle light will be permitted passage through the interface 12, correspondingly low voltages between the terminals 27 will be necessary in effecting these angular changes.

Referring now to FIG. 4, acousto-optic means are illustrated which can be used for establishing the required spatial modulation of the refractive index of materials coincident with the normally light reflecting interface 11, in place of using the type electrode structure of FIG. 3. A transducer means 55 is shown which can be energized through switch means 56 to an appropriate voltage source 57 so as to establish a propagating of acoustic waves 58 at the surface of the light guide 10 materials interface 11.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims.

I claim:
1. Light beam distributor means, comprising:
   a. a light admitting surface;
   b. a source of light and means for directing light therefrom along an input path toward said admitting surface and thereupon along a primary optical path while undergoing a series of light reflections within said distributor means so as to establish an availability of light from said source at a plurality of predetermined light output positions of said distributor means for an optically controlled redirecting of light along a selected one of a plurality of secondary optical paths stemming from said output positions;
   c. said means for directing light along said primary path including an array of light reflecting interfaces of first and second light conducting media presenting, respectively, first and second indices of refraction, each of said interfaces presenting a length dimension and each angularly oriented so as to establish an optical relationship one with respect of the other, with respect to said input path, and with respect to said secondary optical path, said array of interfaces providing a series of 360° primary optical paths for said light, each said 360° path displaced one with respect to the other in a side-by-side relationship in the direction of said length dimension:
   d. said output positions extended along said length dimension coincident with a predetermined one of said interfaces of first and second light conducting media of said array of interfaces, light reflection control means extended along said length dimension adjacent an interface of first and second light conducting media preceding said one interface for effecting, selectively, a redirecting of light along a path away from said primary optical path toward an output position of said one interface so as to establish an angle of incidence of said light thereon for frustrating a reflection of said light therefrom and thereby allowing a passing of light along a secondary path stemming from said output position.

2. The invention as set forth in claim 1, wherein said light reflection control means establishes a spatially varying change of index of refraction in said first and second light conducting materials adjacent said interface thereof for effecting said redirecting of light along a path away from said primary optical path.

3. The invention as set forth in claim 2, wherein said light reflection control means is a spatially periodic interdigital electrode assembly and means for connecting a voltage thereto, said assembly consisting of first and second electrodes supported closely adjacent to said interface of first and second light conducting materials in an optical light reflection control relationship to the output position thereof.

4. The invention as set forth in claim 1, wherein said light reflection control means is an acoustic wave generator and means for connecting a voltage thereto for establishing a spatially varying change of index of refraction in at least one of said first and second light conducting materials adjacent said interface thereof for effecting said redirecting of light along a path away from said primary optical path.

5. A light optic data handling system comprising:
   a. a source of light and means for directing light therefrom along a primary optical path within said system so as to establish an availability of light from said source at a plurality of predetermined locations along said path for a redirecting of light from a selected one of said locations to, and along, a corresponding one of a plurality of secondary optical paths stemming, respectively, from said locations, each said location representative of an output control position;
   b. said means for directing light along said primary optical path including an array of light reflecting surfaces, each surface presenting a length dimension and each angularly oriented so as to establish an optical relationship one with respect to the other for allowing light from said source to be directed along said primary path forming a helix of plural revolutions, each revolution including at least one of said locations representative of an output control position;

c. said output control positions extended along said length dimension coincident with a predetermined one of said light reflecting surfaces of said array of surfaces;

d. light reflection control means extended along said length dimension adjacent, respectively, each of said output control positions for effecting, selectively, a redirecting of light along a path away from said primary path to, and along, a corresponding one of said secondary paths, said secondary path extending beyond the light reflecting limits of said array of light reflecting surfaces.

* * * * *